United States Patent [19]

Jansen

[11] 4,074,078
[45] Feb. 14, 1978

[54] TELEPHONE PRIVACY DEVICE

[75] Inventor: Bernard L. Jansen, Denver, Colo.

[73] Assignee: The Raymond Lee Organization, Inc., New York, N.Y.

[21] Appl. No.: 558,726

[22] Filed: Mar. 17, 1975

[51] Int. Cl.² ............................................. H04M 1/64
[52] U.S. Cl. .................... 179/84 C; 179/2 A
[58] Field of Search ................ 179/84 C, 84 R, 81 R, 179/2 A, 2 R, 1 C, 2 C, 6 R, 18 D, 84 VF

[56] References Cited

U.S. PATENT DOCUMENTS

| 3,061,783 | 10/1962 | Noller | 179/84 VF |
|---|---|---|---|
| 3,187,108 | 6/1965 | Clin | 179/84 C |
| 3,226,489 | 12/1965 | Grambsch | 179/84 C |
| 3,293,371 | 12/1966 | Burns | 179/85 VF |
| 3,514,548 | 5/1970 | De Meo | 179/84 C |
| 3,515,806 | 6/1970 | Spraker | 179/1 C |
| 3,614,326 | 10/1971 | Cameron | 179/2 A |
| 3,654,396 | 4/1972 | Biezeveld | 179/18 D |
| 3,784,721 | 1/1974 | Kilby | 179/84 C |
| 3,793,487 | 2/1974 | Kilby | 179/84 C |
| 3,859,462 | 1/1975 | Saxon | 179/2 A |

Primary Examiner—Kathleen H. Claffy
Assistant Examiner—Joseph A. Popek
Attorney, Agent, or Firm—Howard I. Podell

[57] ABSTRACT

A device for installation to a telephone which prevents the telephone from ringing except for incoming calls from selected individuals who have been furnished a key device. The key device emits an audible tone into the mouthpiece of the calling telephone which signals the installed device at the called telephone location to accept the call and actuate the called telephone bell or signal. The installed device is connected to the telephone wire of the installed telephone with electronic circuitry that disconnects the ringing current circuit to the installed phone immediately upon the appearance of the ringing current on the phone line, thus preventing ringing of the called telephone bell. The device then sends an electrical signal, which is recognizable as an audible tone, in the receiver of the calling telephone. The authorized caller places the key device adjacent to the mouthpiece of the calling telephone and actuates a switch on the key device to cause it to emit an audible tone, the frequency and duration of which constitutes the recognition signal to the installed device. Failure of the caller to send the proper recognition signal within the pre-set time causes the installed device to clear the telephone line resulting in the calling telephone receiving a dial tone. Upon proper receipt of the recognition signal, the installed device emits an audible signal to the user of the called telephone for a pre-set time period, after which, if the called phone is not answered, the called telephone line is closed to disconnect the circuit.

2 Claims, 4 Drawing Figures

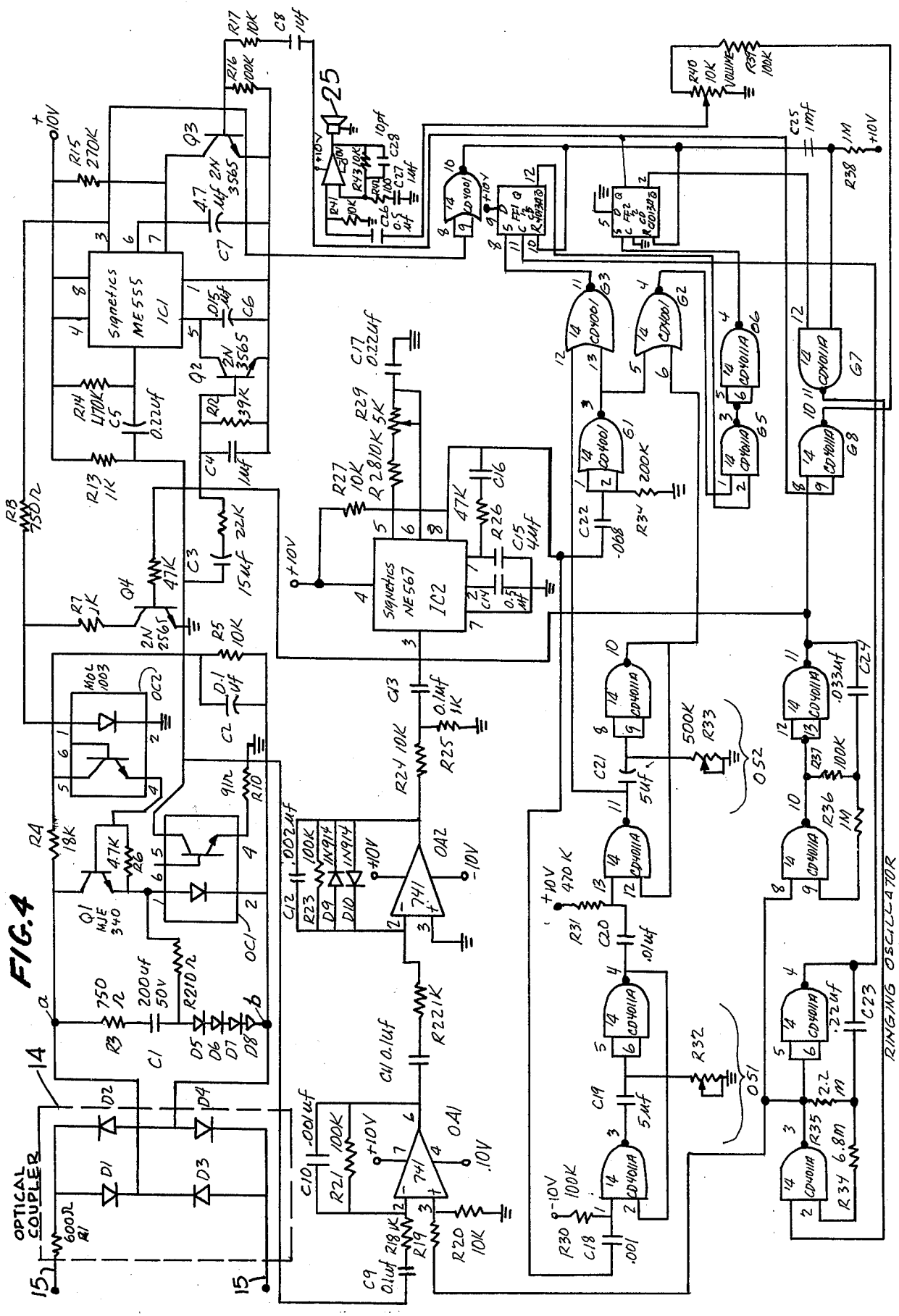

TELEPHONE PRIVACY DEVICE

SUMMARY OF THE INVENTION

My invention is a device for installation to a telephone which prevents the telephone from ringing except for incoming calls from selected individuals who have been furnished a key device. The key device emits an audible tone into the mouthpiece of the calling telephone which signals the installed device at the called telephone location to accept the call and actuate the called telephone bell or signal. The installed device is connected to the telephone wires of the installed telephone with electronic circuitry that disconnects the ringing current circuit to the installed phone immediately upon the appearance of the ringing current on the phone line, thus preventing ringing of the called telephone actuating the circuitry of the device. The device then sends an electrical signal, which is recognizable as an audible tone, in the receiver of the calling telephone.

The telephone privacy device of this invention allows its user to limit incoming phone calls to those calls coming from specific individuals who have been issued keying devices by him. This allows the user to avoid the annoyance of phone calls from solicitors, wrong numbers, and other unimportant callers. The device may be simply disabled at any time by the user so that friends, relatives, and business associates without keying devices may reach him. The device does not affect outgoing calls. An additional advantage to the home owner is that potential burglars cannot determine if someone is home by seeing if someone answers the phone, since, when the device is engaged, the phone will not ring unless the caller has the keying device for the user's phone.

The invention consists of an electronic unit connected across the user's phone line and a number of portable electronic key devices issued by the user to those people whom he wishes to have unlimited access to his phone. The key device is housed in a package no larger than a cigarette lighter and thus, may be carried in pocket or purse. When the key device is held over the mouthpiece of the caller's phone and a button pressed, the key emits an audible tone of a particular frequency and duration unique to the installed called phone unit. The key device is battery operated, with anticipated battery life of a year or more, depending on frequency of use.

BRIEF DESCRIPTION OF THE DRAWINGS

The objects and features of the invention may be understood with reference to the following detailed description of an illustrative embodiment of the invention, taken together with the accompanying drawings in which:

FIG. 4 is a schematic diagram of the circuitry of the installed device.

DESCRIPTION OF THE PREFERRED EMBODIMENT

Figure 1:
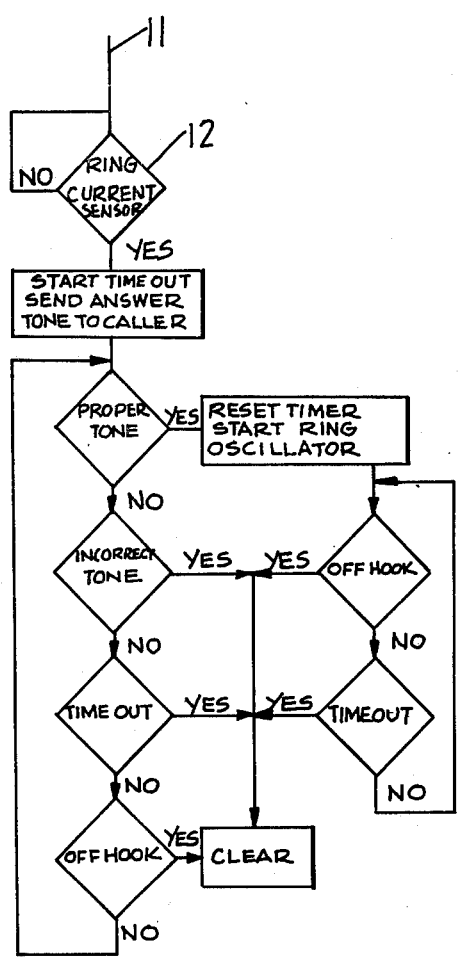
FIG. 1 is a block diagram of the operation of the installed device.
Figure 2:
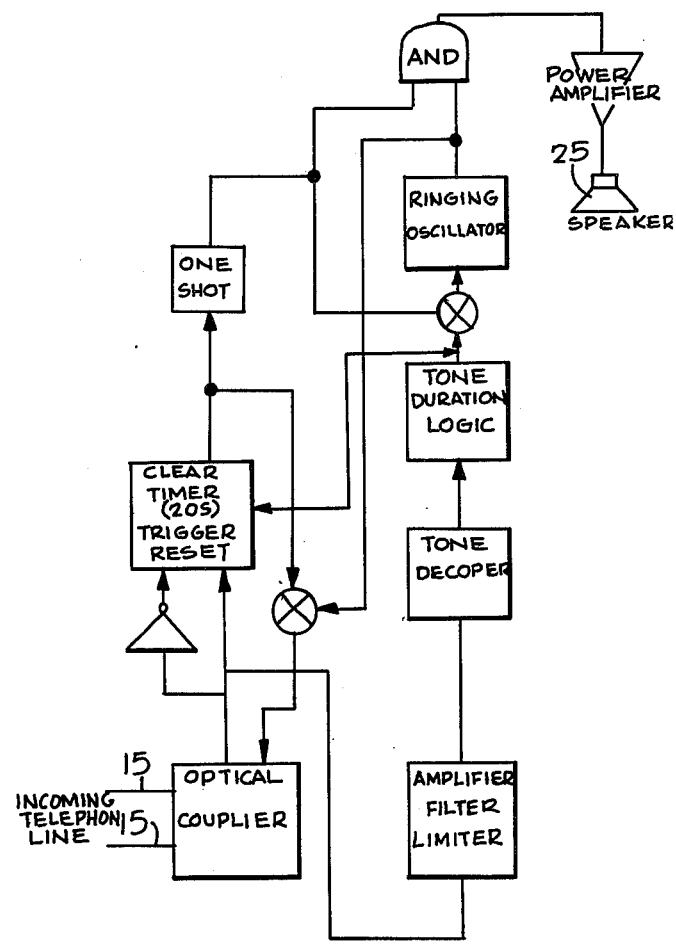
FIG. 2 is a block diagram of the circuitry of the installed device.

Turning now descriptively to the drawings, in which similar reference characters denote similar elements throughout the several views, the operation of the electronic unit installed across the user's telephone line is illustrated in the block diagrams of FIGS. 1 and 2. When the user's phone number is dialed from a calling telephone and ringing current appears on the phone line 11, the line is "opened" by the Ring Current Sensor 12 causing the ringing current to be cut off by the telephone company equipment. This occurs fast enough to prevent any ringing of the telephones on the user's line. A short answer tone is then sent over the line to the caller to signal him to return the audible recognition signal tone from his keying device. If after twenty seconds, the proper tone is not returned by the caller, the user's phone line is automatically closed (cleared) again and the caller hears a conventional dial tone. If the proper audible tone is received, the electronic unit will emit a tone through its loudspeaker 25 to signal the user that he has a phone call. If the called phone is answered (off hook), the loudspeaker tone stops and a conversation can take place. If the called phone is not answered within one minute, the tone from the loudspeaker ceases, the line is closed again, and the caller will hear a conventional dial tone.

The circuitry of the installed device conforms to the block diagrams shown in FIG. 2 and FIG. 4. Since telephone company regulations prohibit active devices across their lines, it is necessary to couple signals into and out of the device from the telephone line 15 using isolation devices such as a transformer or an optical coupler 14.

Referring to FIG. 4, when the input leads 15 are connected across the user's phone line, a voltage of 40 to 50 volts dc appears from point $a$ to point $b$ with point $a$ positive. No current passes through the light emitting diode of circuit OC1 which causes the voltage at pin 5 of circuit OC1 to drop from +10 volts to about zero volts. This triggers circuit IC1 into its timing mode during which pin 3 of IC1 is held at about +10 volts. At this time, current passes from pin 3 through resistor R8 to circuit OC2 which causes transistor Q1 to conduct. This causes the voltage from point $a$ to point $b$ to be dropped through resistor R1. The current drain through resistor R1 simulates the effect of answering the telephone, in so far as the telephone company central office equipment is concerned. The entire above sequence from the occurrance of the ring current to the simulation of "answering" occurs within a fraction of a second of the appearance of the ring current on the telephone line 11. This is rapid enough that the ringing current will be stopped by the central office equipment before the attached telephone's bell will ring.

If the privacy circuit does not receive the proper key tone before circuit IC1 times out, pin 8 of IC1 will return to zero volts and, allow the telephone line to be reopened. This will cause the telephone company central office equipment to return a dial tone to the caller.

When circuit IC1 goes into the timing mode during the "answering" sequence, the ringing oscillator is immediately enabled through gate G7 for about half a second. This signal, coupled through transistor Q9 and circuit OC2 to the phone line, signals the caller to signal the audible recognition tone with his keying device. If a signal is returned, it is coupled through circuit OC1 to amplifiers OA1 and OA2 where it is filtered, amplified and limited. The frequency of the incoming tone is detected by circuit IC2. If the incoming frequency is within 5% of what it should be as determined by resistor R29, then pin 8 of circuit IC2 switches from +10 volts to about 0 volts, which triggers the one shot circuit, OS1. When circuit OS1 times out, it triggers circuit OS2. If the key tone ends while circuit OS2 is triggered (i.e., after circuit OS1 times out but before circuit OS2 times out), a pulse is coupled through gates G1, G2, G5, and G6 to set the ring flip-flop circuit, FF2. If the key tone does not end while circuit OS2 is in the triggered state, a pulse is coupled through gates G1 and G3 to set the inhibit flip-flop circuit, FF1. If circuit FF1 is set, no pulse may reach circuit FF2. Both circuits FF1 and FF2 are reset when IC1 times out and pin 3 of IC1 returns to 0 volts.

If the proper tone frequency and duration are received, and circuit FF2 is set, then the ringing oscillator is enabled again through gate G7. The oscillator output is coupled through gate G8 to the output amplifier and speaker 25. The output tone also is audibly coupled back to the caller so that he knows that the user is being signalled. At the same time, the ringing oscillator is enabled, transistor Q3 conducts momentarily, which resets IC1 for an additional 20 second time out. If the user answers the called telephone, the current through the light emitting diode of OC1 will be reduced causing the voltage at pin 5 of OC1 to rise, which in turn induces current flow through condenser C3 and resistor R11 to turn on transistor Q2 momentarily. This causes circuit IC1 to time out immediately, thus removing the privacy circuit from the telephone line and allowing a conversation to proceed normally.

If the user does not answer the called telephone within 20 seconds of the beginning of ringing tone, circuit IC1 will time out, stop the ringing oscillator, disconnect the circuit from the phone line via circuit OC2, and leave the caller with a dial tone.

Figure 3:
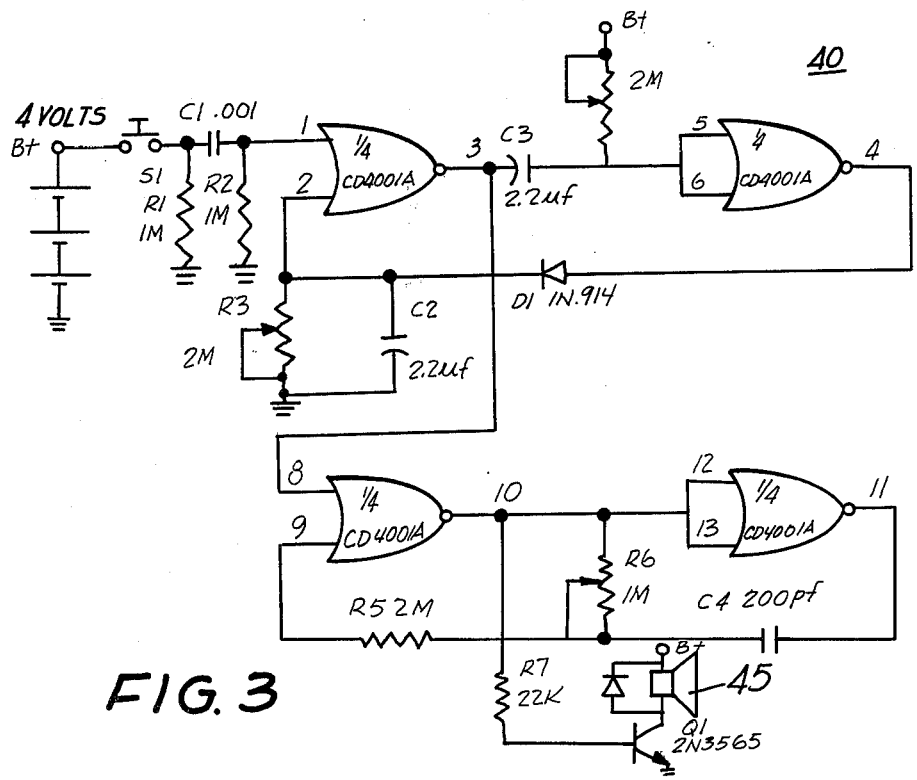
FIG. 3 is a schematic diagram of the keying device oscillator.

The keying device circuit 40 is shown in FIG. 3. When push button switch S1 is closed, the output of gate G2 goes from 0 volts to 4 volts. This enables the tone oscillator, consisting of gates G3 and G4, for a period determined by resistor R3 in combination with C2. The frequency of the oscillator is determined by resistor R6 in combination with condenser C4. Transistor Q1 drives a tiny loud speaker 45 which is held over the calling telephone mouthpiece. The power consumption of this circuit when not actually producing a tone is negligible. This makes battery operation of the keying device especially practical. Except in cases of heavy use, the life of the batteries in the keying device is virtually their shelf life.

Since obvious changes may be made in the specific embodiment of the invention described herein, such modifications being within the spirit and scope of the invention claimed, it is indicated that all matter contained herein is intended as illustrative and not as limiting in scope.

Having thus described the invention, what I claim as new and desire to secure by Letters Patent of the United States is:

1. A privacy circuit adaptable for installation to the incoming lines of a called telephone connected through a conventional telephone exchange which signals an incoming call only if the calling party generates an audible recognition signal through the mouthpiece of the calling telephone, said device inhibiting the sounding of the conventional bell of the attached called telephone for all incoming calls, without requiring detachment of the circuity of said bell, said privacy circuit comprising a first circuit connected to the incoming lines of the called telephone, said first circuit including electronic means to sense and to inhibit an incoming ringing signal and prevent ringing of the attached bell of the called telephone, said electronic means of said first circuit including electronic circuit means to immediately reduce the voltage across the incoming called telephone line so as to simulate the answering of the called telephone, upon sensing an incoming ringing signal and before the bell of the called telephone can be actuated by the ringing signal, with said reduction of voltage across the line of the called telephone causing the central telephone exchange to discontinue the ringing signal prior to actuation of the attached bell of the called telephone, and a timer circuit which holds said first circuit in the sensed condition for a pre-set period of time after the first circuit inhibits the ringing signal, a first oscillator circuit at the called telephone which sends a signal recognizable as an audible tone to the receiver of the calling telephone, a recognition circuit at the called telephone which is responsive to the receipt of said tone signal generated by the calling party having a specific frequency and specific time duration, for energizing a second oscillator circuit to generate an audible signal through an attached first loudspeaker at the called telephone, said second oscillator circuit controlled by the said timer to remain operative for a pre-set period, said first circuit, when de-energized by the said timer circuit acting to clear the incoming telephone line of the called telephone so that the caller is disconnected from the called line.

2. The circuit described in claim 1 in which the privacy circuit is fitted with optical coupling means for connection of the first said circuit to the external line of the said called telephone so as to otherwise isolate the privacy circuit from the said external telephone line.

* * * * *